United States Patent [19]

Kato et al.

[11] Patent Number: 5,529,296
[45] Date of Patent: Jun. 25, 1996

[54] PEDAL RETURN DEVICE HAVING IMPROVED HYSTERESIS CHARACTERISTICS

[75] Inventors: Yasunari Kato, Toyoake; Hiroaki Yamaguchi; Kazuomi Ota, both of Anjo, all of Japan

[73] Assignee: Nippondenso Co., Ltd., Aichi-Pref., Japan

[21] Appl. No.: 145,142

[22] Filed: Nov. 3, 1993

[30] Foreign Application Priority Data

Nov. 5, 1992 [JP] Japan .................................. 4-296014
Feb. 22, 1993 [JP] Japan .................................. 5-032180

[51] Int. Cl.⁶ .................................................. F02D 11/02
[52] U.S. Cl. ............................ 267/155; 74/513; 267/215
[58] Field of Search .................................. 267/199, 205, 267/208, 210, 211, 214, 215, 216, 155; 74/513

[56] References Cited

U.S. PATENT DOCUMENTS

| | | | |
|---|---|---|---|
| 1,619,035 | 3/1927 | Rafter | 267/208 |
| 1,774,094 | 8/1930 | Gulick | 267/205 |
| 1,834,054 | 12/1931 | Fremaux | 267/215 |
| 2,075,991 | 4/1937 | Kessler . | |
| 4,576,672 | 3/1986 | Griffin et al. | 267/155 |
| 4,579,017 | 4/1986 | Nusser | 267/155 |
| 4,582,653 | 4/1986 | Blanchard et al. . | |
| 4,869,220 | 9/1989 | Imochi . | |
| 5,133,225 | 7/1992 | Lundberg et al. . | |

FOREIGN PATENT DOCUMENTS 3504747  10/1991  Japan .
4128519   4/1992  Japan .

*Primary Examiner*—Matthew C. Graham
*Attorney, Agent, or Firm*—Cushman Darby & Cushman

[57] ABSTRACT

A pedal return device is provided for controlling operation of a pedal member. In particular, the pedal return device imparts a resistive force which resists movement of the pedal member. In the case of an automobile accelerator pedal, this feature allows the driver to more easily maintain a given level of pedal actuation. However, the resistive force is made dependent on whether the pedal member is actually being depressed. Accordingly, once a force applied to the pedal member is removed, the resistive force is correspondingly and assuredly eliminated to permit the pedal member to be reliably returned to an initial rest position by a restoration force generating device provided.

16 Claims, 10 Drawing Sheets

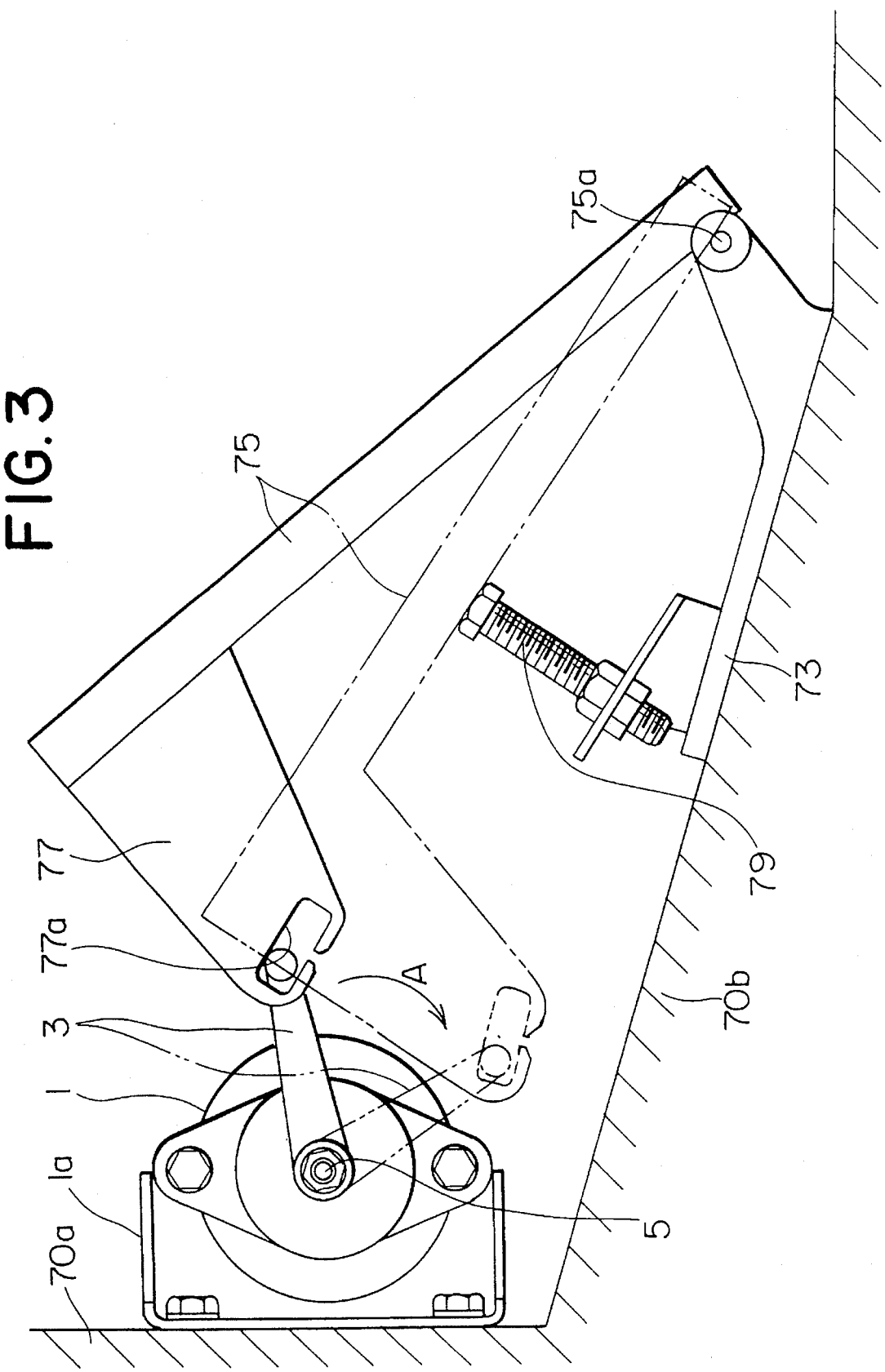

PEDAL RETURN DEVICE HAVING IMPROVED HYSTERESIS CHARACTERISTICS

BACKGROUND OF THE INVENTION

1. Field of the Invention

The present invention relates to a pedal device, especially to an accelerator pedal for vehicles, capable of applying a restoration force to a pedal in accordance with a depression distance of the pedal. More particularly, the present invention is concerned with an accelerator pedal device which can introduce a specific hysteresis to the relationship between the depression distance of an accelerator pedal and the corresponding force required to depress the pedal.

2. Description of Related Art

In general, an accelerator pedal device used in connection with an internal combustion engine employs a spring which is strained in accordance with the distance by which the accelerator pedal is depressed. The restoration force produced by this spring, which increases in proportion to the distance that the pedal is depressed, is transmitted back to the accelerator pedal through a mechanism including a control cable and other elements, so as to restore the pedal to its original rest position. Meanwhile, a throttle control device, referred to as "linkless throttle device", has been proposed in which the depression distance of the accelerator pedal is electrically detected. The throttle opening is controlled in accordance with the detected pedal depression distance of the pedal. In this linkless throttle device, the engine does not apply a load to the accelerator pedal, so the position of the accelerator pedal is determined only by the balance between the restoration force produced by the spring and the manual depression of the accelerator pedal. Consequently, any change in the manual force exerted on the accelerator pedal is directly related to a change in the depression distance of the accelerator pedal. This makes it extremely difficult to maintain a constant level of pedal operation, leading to deterioration in the engine controllability.

In order to solve the above-described problem, an accelerator pedal associated with the above-described linkless throttle device employs a suitable resistance device which poses resistance against the movement of the pedal. Such a resistance device introduces, as explained below, a certain hysteresis to the relationship between the degree of operation of the accelerator pedal (i.e., effectively, the pedal depression distance) and the manual force applied to the accelerator pedal, thereby contributing to improved driveability. It is assumed here that the force being applied to the accelerator pedal is slightly reduced after the pedal is stepped down to a certain position. In such a case, the restoration force applied to the accelerator pedal exceeds the manual force being applied to the pedal, but the pedal is not moved back immediately because of the resistance posed by the resistance device. Thus, the pedal does not move back until the manual force applied to the pedal is reduced to a level which is less than a value obtained by subtracting the movement resistance from the restoration force. It is thus possible to operate the pedal at a constant level of operation, regardless of any slight change in the manual force exerted on the accelerator pedal.

In general, the accelerator pedal operation is usually held constant during heavy load operation of the engine, which requires a large amount of accelerator operation. On the other hand, an operation of the engine with a small amount of accelerator pedal operation requires delicate and frequent adjustment of the accelerator pedal operation. Therefore, the hysteresis of the accelerator control system is preferably so determined to be comparatively large in the region where the accelerator pedal operation amount is large and to be comparatively small in the region where the accelerator pedal operation amount is comparatively small. A large hysteresis in the region of small accelerator pedal operation amount tends to cause a dangerous risk of a phenomenon called "returning failure" in which the accelerator operation cannot be reduced to zero when a depressing force is removed.

Accordingly, a device has been proposed in, for example, Japanese Patent Laid-Open Application No. 4-128519 in which the resistance to movement of an accelerator pedal increases in accordance with increase in the depression distance of the accelerator pedal. In this device, the hysteresis imparted to the relationship between the depression distance of the accelerator pedal and the force exerted on the accelerator pedal is increased in accordance with an increase in the pedal depression distance so as to maintain good driveability over the entire range of amount of accelerator pedal operation.

The known accelerator pedal device of the kind described is susceptible to a returning failure when the spring is at least partly damaged, thereby reducing the restoration force. For instance, current automobiles employ a spring system having two springs to ensure that the accelerator pedal can safely be returned to an inactive rest position even if one of the two springs is broken. In the accelerator pedal device employing this dual spring system, breakdown of one of the springs reduces the total restoration force to about half the restoration force which would be produced when both springs are available. This reduced restoration force is often smaller than the resistance to movement of the pedal, so that the accelerator pedal may fail to move back to its rest position where the throttle is closed, even when the pedal is relieved of a pedal depressing force.

SUMMARY OF THE INVENTION

Accordingly, an object of the present invention is to provide an accelerator pedal device in which the hysteresis introduced to the accelerator pedal depression distance-depression force relationship is enhanced according to an increase in the accelerator pedal depression distance so as to ensure that good driveability is obtained over the entire range of accelerator operation, and in which the accelerator pedal can be safely and assuredly restored to a throttle-closed rest position, even with an unexpected reduction in the restoration force applied to the accelerator pedal.

To these ends, according to one aspect of the present invention, a vehicle accelerator pedal device is provided, comprising: a restoration force application device operative in response to a depression of an accelerator pedal so as to apply a restoration force to the acceleration pedal at a level which increases in accordance with the distance that the accelerator pedal is depressed; and a resistance application device for applying resistance to movement of the accelerator pedal, the level of the resistance increasing in proportion to an increase in the restoration force.

According to a second aspect of the present invention, a vehicle accelerator pedal device is provided, comprising: a restoration force application device operative in response depressing an accelerator pedal so as to apply a restoration force to the acceleration pedal at a level which increases in accordance with the distance that the accelerator pedal is depressed; and a resistance application device for applying resistance to movement of the accelerator pedal, at a level depending on an increase in the depressing force exerted on the accelerator pedal.

In the first aspect of the present invention, the restoration force which is applied to the accelerator pedal by the restoration force application device increases in accordance with an increase in the depression distance of the accelerator pedal. The resistance to movement of the accelerator pedal, applied by the resistance application device, increases in accordance with the increase in the restoration force. Consequently, the resistance to movement of the accelerator pedal increases as the accelerator pedal is increasingly depressed. Therefore, the hysteresis characteristic introduced into the relationship between the depression distance and depressing force on the accelerator pedal is enhanced according to an increase in the distance that the accelerator pedal is depressed.

If the restoration force applied by the restoration force application means is suddenly reduced, due to, for example, a spring failure, the resistance to the movement of the accelerator pedal applied by the resistance application means is reduced to a level which matches the reduced restoration force. It is therefore possible to restore the accelerator pedal to its rest position, even with a reduced restoration force.

In the accelerator pedal device of the second aspect of the present invention, the restoration force increases with the distance that the accelerator pedal is depressed. The depression force required to depress the accelerator pedal also increases in accordance with the increase in the restoration force. The resistance application device resists movement of the acceleration pedal, and the level of the resistance increases according to an increase in the depression force exerted on the accelerator pedal. Consequently, the level of the resistance against the movement of the accelerator pedal increases as the accelerator pedal is depressed to a greater degree. Therefore, the hysteresis characteristic introduced into the relationship between the depression distance and depression force of the accelerator pedal is enhanced in proportion to the distance that the accelerator pedal is depressed.

If the restoration force applied by the restoration force application device is reduced due to, for example, a failure, the force required to depress the accelerator pedal is decreased correspondingly. In such a case, the level of the resistance to the movement of the accelerator pedal applied by the resistance application device is also reduced to a level which matches the force required to depress the accelerator pedal after the reduction in the restoration force. The accelerator pedal can therefore be assuredly restored to a rest position despite the reduction in the restoration force.

According to the second aspect of the invention, a reduction in the force exerted on the accelerator pedal causes a corresponding reduction in resistance to the movement of the accelerator pedal, regardless of the level of the restoration force. By virtue these features, the second embodiment offers the following advantage.

The resistance application device may deteriorate or become damaged after long use so as to apply a resistance greater than that initially set for each level of the pedal depression force. For instance, in the case of a device which applies friction resistance, the friction coefficient may be abnormally increased due to, for example, damage to a friction surface. In such a case, the restoration force corresponding to a certain level of pedal depressing force may be exceeded by the corresponding resistance to the movement of the accelerator pedal.

However, the force exerted on the accelerator pedal can be decreased according to the driver's wishes. It is therefore possible to easily create a condition where the resistance to movement of the accelerator pedal is less than the restoration force, despite an increase in resistance to accelerator pedal movement from an initially set level of resistance by reducing the force exerted on the accelerator pedal. The vehicle accelerator pedal device of the second aspect of the present invention, therefore, ensures that the accelerator pedal can safely be returned to a rest, throttle-closed position, even when the resistance to movement of the acceleration pedal increases from an initially set level.

BRIEF DESCRIPTION OF THE DRAWINGS

FIG. 3 is a side elevational view of the first embodiment illustrating the manner in which the accelerator pedal device is installed;

DESCRIPTION OF THE PREFERRED EMBODIMENTS

Figure 1:
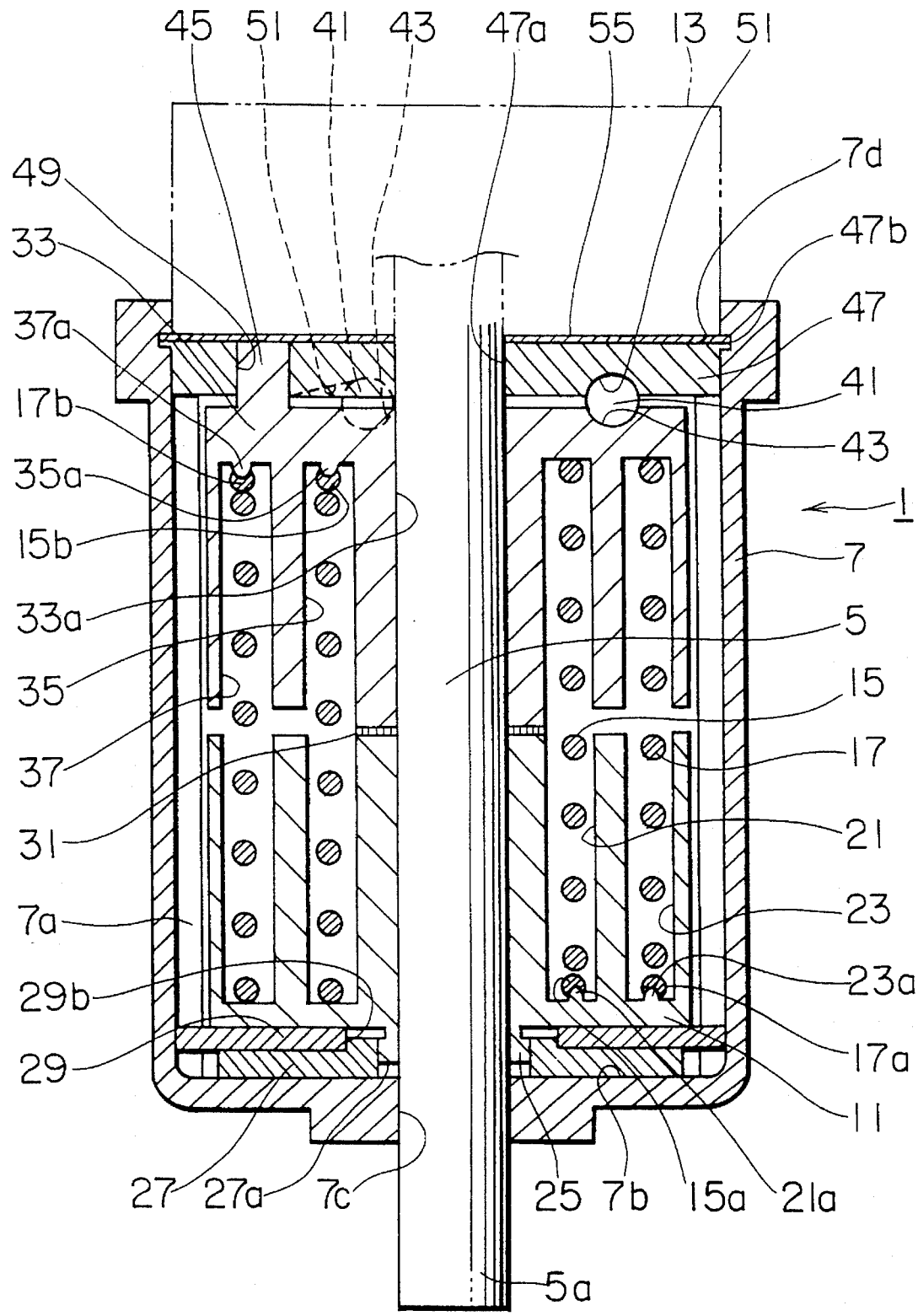
FIG. 1 is a sectional view of a first embodiment of the vehicle accelerator pedal device in accordance with the present invention.

Preferred embodiments of the present invention will be described with reference to the accompanying drawings. Embodiments of the first aspect of the invention will be described first, with specific reference to FIGS. 1 to 7.

FIG. 3 is a side elevational view of the first embodiment of the vehicle accelerator pedal return device of the present invention, which illustrates the manner in which the accelerator pedal return device is mounted. The accelerator pedal return device, generally denoted by numeral 1, is fixed through a bracket 1a to a front bulkhead 70a which is disposed in a lower part of the space in front of the driver's seat of a vehicle. A supporting bracket 73 is provided on the portion of a floor 70b in front of the driver's seat. The supporting bracket 73 pivotally supports an accelerator pedal 75 for pivotal motion around a pivot shaft 75a. The accelerator pedal 75 has on the end thereof an engaging tab 77 which is provided with a notch 77a engageable with a lever 3 of the accelerator pedal device 1. In operation, as the driver steps down on the accelerator pedal 75, the lever 3 pivots about a rotary shaft 5 of the accelerator pedal device 1. A bolt 79 which projects from the supporting bracket 73 serves to stop the accelerator pedal 75 so as to limit its range of pivot motion.

Figure 2:
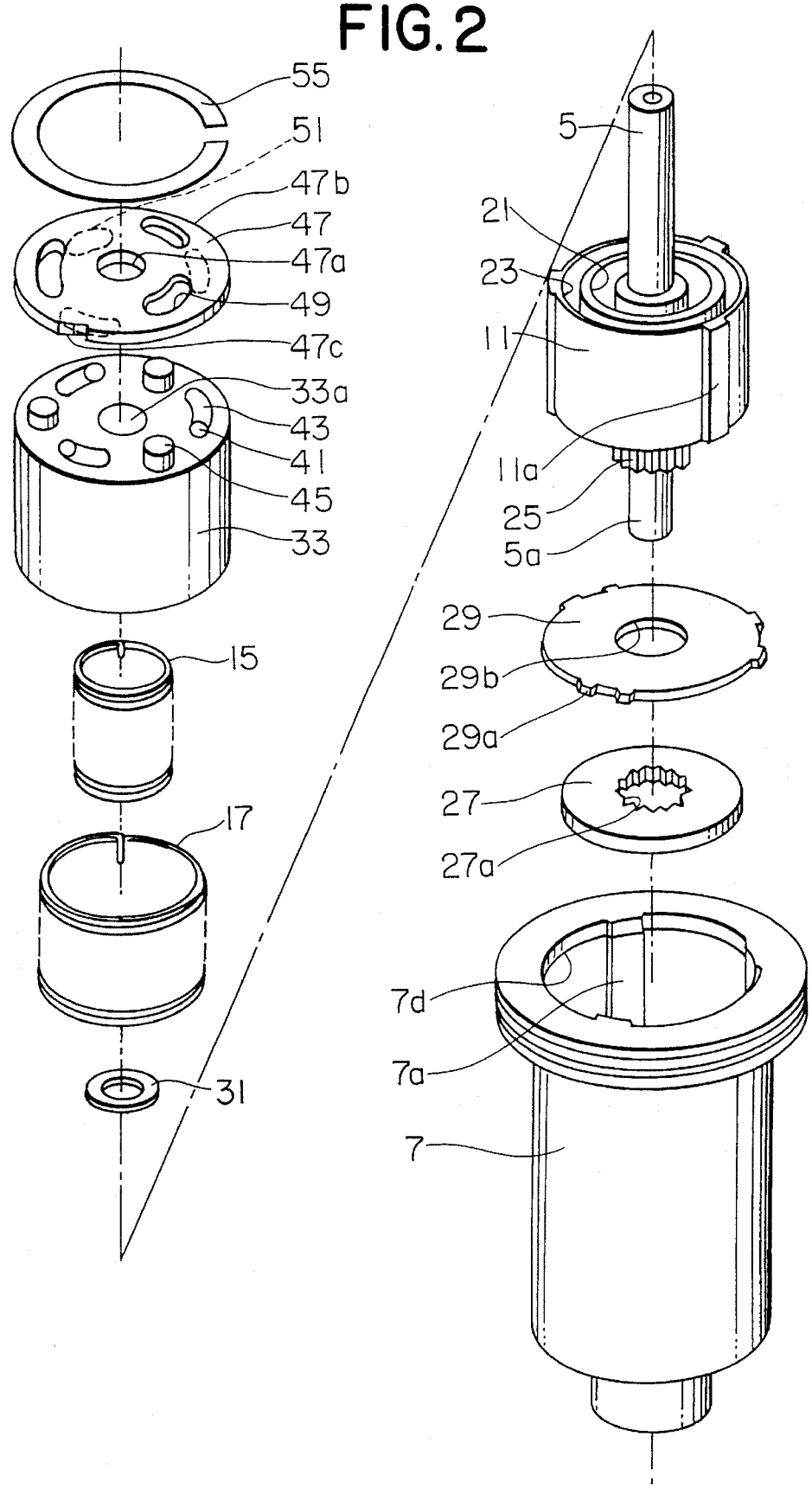
FIG. 2 is an exploded perspective view of the embodiment shown in FIG. 1.

FIG. 1 is a sectional view of the accelerator pedal device 1, while FIG. 2 is an exploded perspective view of the same. As shown in these Figures, a housing 7 of the accelerator pedal device 1 rotatably holds the rotary shaft 5 mentioned above. A first rotor 11 is fixed to the central portion of the rotary shaft 5. One end 5a of the rotary shaft 5 is adapted to hold the aforementioned lever 3 (see FIG. 3) fixed thereto. The other end of the rotary shaft 5 is received in a bore formed in an accelerator position sensor 13.

The first rotor 11 has a small-diameter annular groove 21 and a large-diameter annular groove 23 which are inserted from the axial end opposite to the end 5a of the shaft 5. The annular grooves 21 and 23 are coaxial with the axis of the rotary shaft 5 and, hence, coaxial with each other. The small-diameter spring 15 and the large-diameter spring 17 are torsion coiled springs which are used to apply a restoration force to the accelerator pedal. Retaining portions 21a and 23a formed on the bottoms of the annular grooves 21 and 23 retain the ends 15a and 17a of these springs 15 and 17. A spur gear 25 centered at the axis of the rotary shaft 5 is formed on the end of the first rotor 11 adjacent to the end 5a of the shaft 5. The first rotor 11 is provided with axially extending ribs 11a formed on the outer peripheral surface thereof. The arrangement is such that, as the first rotor 11 is restored by the restoration force exerted by the springs 15 and 17, the axial ribs 11 are brought into engagement with axial ribs 7a which are formed on the inner peripheral surface of a housing 7 so as to determine the restoration position of the first rotor 11.

A shaft-side friction plate 27 is provided on the bottom surface 7b of the housing 7. The shaft-side friction plate 27 has an internally-toothed gear 27a which engages with the spur gear 25. A housing-side friction plate 29 is provided on the surface of the shaft-side friction plate 27. The housing-side friction plate 29 is provided with engaging projections 29a (see FIG. 2) which are adapted to engage with the axial ribs 7a on the housing 7 so as to prevent the housing-side friction plate 29 from rotating relative to the housing 7. The housing-side friction plate 29 is provided with a circular hole 29b which is adapted to receive the spur gear 25. The aforementioned first rotor 11, which is integral with the rotary shaft 5, is disposed on the surface of the housing-side friction plate 29. The rotary shaft 5 extends through a hole 7c formed in the housing 7 so that the spur gear 25 is extended through an aperture 29b formed in the housing-side friction plate 29 into engagement with the internally-toothed gear 27a presented by the shaft-side friction plate 27. According to this arrangement, the shaft-side friction plate 27 and the first rotor 11 rotate as a unit with the rotary shaft 5.

A washer 31 having a diameter smaller than that of the small-diameter annular groove 21 has an aperture which receives the rotary shaft 5 so that the washer 31 is placed on the surface of the first rotor 11. The small-diameter annular groove 21 and the large-diameter annular groove 23 of the first rotor 11 respectively receive the aforementioned small-diameter spring 15 and the large-diameter spring 17. A second rotor 33 is placed on the surface of the first rotor 11 through the intermediary of the washer 31, small-diameter spring 15 and the large-diameter spring 17.

The second rotor 33 has an aperture 33a which can rotatably receive the rotary shaft 5. The second rotor 33 also has a small-diameter annular groove 35 and a large-diameter annular groove 37 which open in the end surface of the second rotor adjacent the first rotor 11 in axial alignment with the small-diameter annular groove 21 and the large-diameter annular groove 23 of the first rotor 11, respectively, so as to receive the small diameter spring 15 and the large-diameter spring 17. The small- and large-diameter annular grooves 35 and 37 also have retaining portions 35a and 37a for engaging with and retaining the ends 15b and 17b of the small- and large diameter springs 15 and 17, as are the cases of the annular grooves 21 and 23 of the first rotor 11. Three steel ball grooves 43 for bearing steel balls 41 and three projections 45 are alternately formed on the end surface of the second rotor 33 opposite to the first rotor 11, at 60° intervals. A disk-shaped stopper 47 is placed on the surface of the second rotor 33 with the three steel balls 41 interposed therebetween. More specifically, the stopper 47 is provided with a central bore 47a for rotatably receiving the rotary shaft 5, three arcuate holes 49 for loosely receiving the projections 45 on the second rotor 33, and three steel balls grooves 51 which oppose the steel ball grooves 43 in the second rotor 33 so as to hold the steel balls 41 therebetween. As will be seen from FIG. 4, the depth of the steel ball groove 51 progressively increases towards a leading side, as viewed in the direction (arrow B) of rotation of the second rotor 33, while the depth of the steel ball groove 51 progressively decreases in the same direction. Therefore, rotation of the second rotor 33 about the rotary shaft 5 causes a change in the distance between the second rotor 33 and the stopper 47, as will be detailed later.

Referring back to FIGS. 1 and 2, a flange 47b is formed on the end of the stopper 47 opposite to the second rotor 33. An engaging groove 47c (see FIG. 2) for engagement with the rib 7a on the housing 7 is formed in the outer peripheral edge of the stopper 47. The flange 47b is received in a groove 7d formed in the brim of opening in the housing 7, together with a circlip 55 placed on the surface of the stopper 47, thereby preventing the members received in the housing 7 from coming off the housing 7. The engaging groove 47c engaging with the rib 7a prevents the stopper 47 from rotating relative to the housing 7. The aforementioned accelerator position sensor 13 (see FIG. 1) is secured so as to rest on the surface of the stopper 47 within the upper end opening of the housing 7.

The operation of the accelerator pedal device 1 having the described construction is as follows. When the driver steps down on the accelerator pedal 75, the lever 3 rotates in the direction of the arrow A as viewed in FIG. 3. As a consequence, the first rotor 11 also rotates as the rotary shaft 5 rotates. The shaft-side friction plate 27 also rotates together with the first rotor 11 through the spur gear 25, so that the shaft-side friction plate 27 rotates as a unit with the lever 3. Meanwhile, the housing-side friction plate 29 is fixed against rotation relative to the housing 7. Consequently, a friction force is generated between the first rotor 1 and the housing-side friction plate 29, between the housing-side friction plate 29 and the shaft-side friction plate 27 and between the shaft-side friction plate 27 and the bottom surface 7b of the housing 7. Thus, the housing-side friction plate 29 and the shaft-side friction plate 27 interact to generate a resistance against movement of the accelerator pedal.

The small-diameter springs 15 and the large diameter spring 17 are retained at their respective ends on the bottoms of the small-diameter annular grooves 21, 35 and on the bottoms of the large-diameter annular grooves 23, 37, respectively, so that these springs 15 and 17 are strained as they are twisted in accordance with the rotation of the lever 3. The strain of each spring produces restoration force which acts on the accelerator pedal 75 through the lever 3 and, at the same time, causes the following action of the second rotor 33.

Figure 4A:
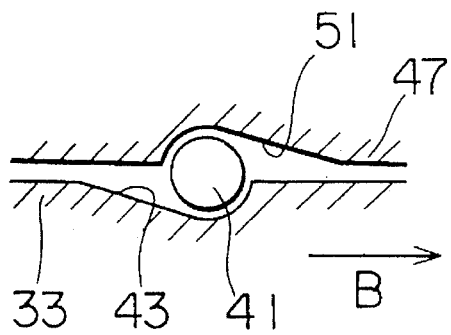
FIGS. 4A and 4B are illustrations of principle of operation of the first embodiment.

The force of the springs 15 and 17 essentially do not act on the second rotor 33 when the accelerator pedal 75 is not being operated (i.e., depressed). Consequently, the second rotor 33 and the stopper 47 are held in a positional relationship as shown in FIG. 4A in which the deepest portion of the steel ball groove 43 in the second rotor 33 opposes the deepest portion of the steel ball groove 51 of the stopper 47, with the associated steel ball 41 clamped therebetween.

Figure 4B:
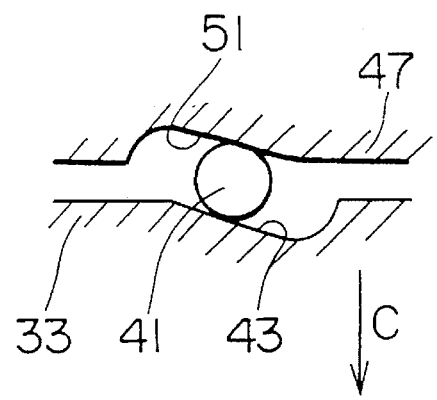

When the accelerator pedal 75 is depressed to a greater degree, the springs 15 and 17 are strained so that a force is applied to the second rotor 33 to act in the direction of the arrow B. As a result, the second rotor 33 rotates relative to the stopper 47 so that a positional relationship as shown in FIG. 4B is obtained in which the steel ball is held between shallower portions of the steel ball grooves 43 and 51. Since the stopper 47 is prevented from moving axially outward due to engagement between the flange 47b and the groove 7d in the housing through the action of the circlip 55, the second rotor 33 is pressed in the direction of the arrow C.

Figure 5:
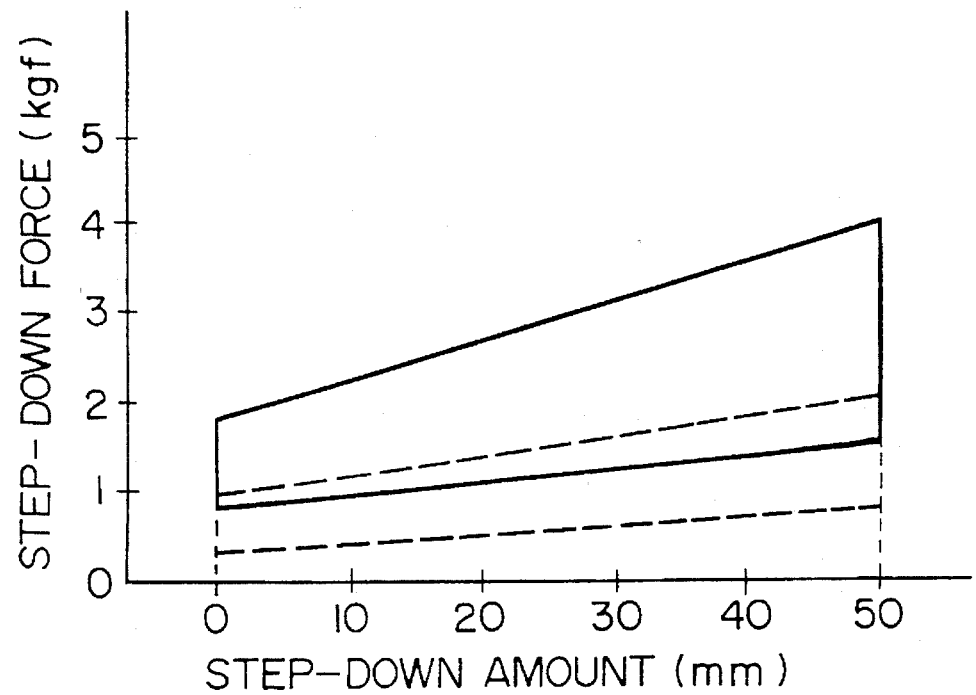
FIG. 5 is a graph indicative of the relationship between the amount of step down of the accelerator pedal and the force required for stepping down the accelerator pedal in the first embodiment.

This pressing force is transmitted through the washer 31 so as to act between the first rotor 11 and the housing-side friction plate 29, between the housing-side friction plate 29 and the shaft-side friction plate 27 and between the shaft-side friction plate 27 and the bottom surface 7b of the housing 7, thus increasing the levels of the frictional forces acting therebetween. The force acting on the second rotor 33 in the direction of the arrow b increases as the strains of the springs 15 and 17 increase, i.e., as the restoration force applied to the accelerator pedal 75 increases. Consequently, the steel ball 41 are held by further shallower portions of both steel ball grooves 43, 51, so that the pressing force acting in the direction of the arrow C is increased correspondingly. Thus, the levels of frictional forces acting on and between the first rotor 11, the housing-side friction plate 29, the shaft-side friction plate 27 and the bottom surface 7b are elevated in accordance with the increase in the restoration force acting on the accelerator pedal 75. As a consequence, a relationship as shown by solid line in FIG. 5 is obtained between the pedal depression force exerted on the accelerator pedal 75 and the distance that the pedal is depressed. It will be seen that the depression distance linearly increases in accordance with an increase in the pedal depression force, and linearly decreases in accordance with a decrease in the pedal depression force. It is to be noted, however, there is a difference in the depression force for a given depression distance depending on whether the depression force is being increased or decreased, due to influence of frictional forces acting on and between the first rotor 11, the housing-side friction plate 29, the shaft-side friction plate 27 and the bottom surface 7b. The amount of this difference in the depression force is referred to as a "hysteresis amount" in this specification.

This hysteresis is attributed to the fact that the position or depression distance of the acceleration pedal is determined by the balance between the resilient restoration force produced by the springs 15, 17 (which is substantially proportional to the depression distance) and the sum of the depression force and the total friction force which acts in the direction opposite to the depression force when the accelerator pedal is being depressed to greater degree and in the same direction as the depression force when the accelerator pedal is being released, i.e., when the depression force is being decreased. As explained before, the depression force increases in accordance with the increase in the amounts of strain of the springs 15 and 17, so that the amount of hysteresis increases as the depression distance of the accelerator pedal 75 increases. Consequently, a constant level of accelerator pedal actuation is easy to maintain in the region where the distance to which the accelerator pedal 75 is depressed is large. At the same time, delicate control of the accelerator pedal depression distance is also facilitated in the region where the depression distance is comparatively small. Consequently, good driveability is ensured over the entire range of actuation of the accelerator pedal.

A reduction in the restoration force applied to the accelerator pedal due to, for example, a breakdown of the spring 15 or 17 causes a similar reduction in the hysteresis. Broken-line curve in FIG. 5 shows the relationship between the depression force and the depression distance of the accelerator pedal as obtained when the spring 15 has failed. A similar relationship is obtained when the spring 17 has been broken.

In the event that one of the springs 15 and 17 is broken, the restoring force applied to the accelerator pedal 75 is almost half of which would be applied when both springs are operational. At the same time, the above-mentioned total friction force, i.e., the amount of hysteresis, is also reduced by half. As a consequence, the force required to depress the accelerator pedal to a desired degree is also reduced by half, both when the depression force is being increased and when the depression force is being decreased. It is therefore possible to completely eliminate returning failure, where the depression force is reduced to zero even though the depression distance has not been reduced to zero.

The described embodiment employs a dual spring system, including two springs 15 and 17 as means for applying a restoration force. This, however, is only illustrative and the restoration force may be applied by other suitable means such as a single spring, or a rubber or a pneumatic spring. When an alternative restoration force generating device is used, good driveability is ensured over the entire range of actuation of the accelerator pedal 75 and occurrence of returning failure in the event of a reduction in the restoration force due to, for example, breakdown of the restoration force generating device is avoided.

In the described embodiment, the levels of friction forces acting on and between the first rotor 11, housing-side friction plate 29, shaft-side friction plate 27 and the bottom surface 7b of the housing 7 are varied in accordance with the change in the restoration force applied to the accelerator pedal 75, thereby changing the resistance to movement of the accelerator pedal 75. This, however, is only illustrative and resistance to movement of the accelerator pedal 75 may be adjusted by various other means.

Figure 6:
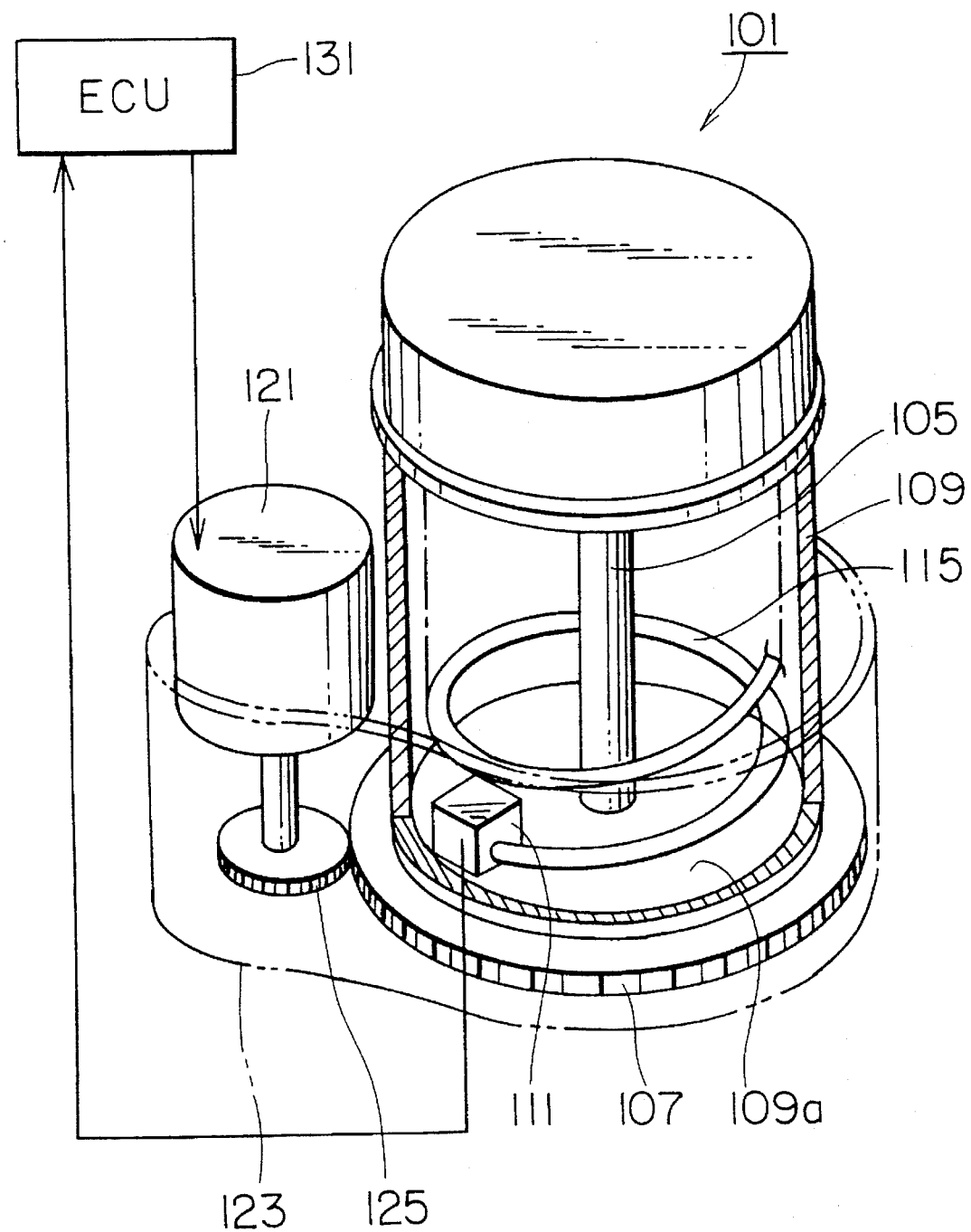
FIG. 6 is a perspective view of a second embodiment of the vehicle accelerator pedal device of the present invention.

FIG. 6 is a perspective view of a vehicle accelerator pedal device 101 as a second embodiment of the present invention. A large-diameter gear 107 is fixed to a rotary shaft 105 to which a lever 3 (see FIG. 3) can be attached. A pressure sensor 111 is fixed on the bottom surface 109a of a housing 109 having an opening which rotatably receives the rotary shaft 105. A spring 115 is disposed in the housing 109. One end of the spring 115 abuts the pressure-receiving surface of the pressure sensor 111, while the other end of the spring 115 is retained on the rotary shaft 105 through a rotor which is not shown, so that the spring 115 applies a restoration force to the accelerator pedal 75 through the rotary shaft 105 in accordance with the distance that the accelerator pedal 75 is depressed (FIG. 3). The pressure sensor 111 outputs a detection signal corresponding to the restoration force.

A housing 109 is encased in a case 123 together with a DC motor 121. A pinion 125 fixed to the shaft of the DC motor 121 meshes with the large-diameter gear 107. The pressure signal from the pressure sensor 111 is input to an electronic control circuit 131 which controls the DC motor 121 in the following manner in accordance with the detection signal.

The electronic control circuit 131 differentiates the pressure signal from the pressure sensor 111 so as to detect the direction of rotation of the rotary shaft 105, and applies to the DC motor 121 a D.C. voltage of a level which increases in accordance with the restoration force applied to the accelerator pedal 75. The D.C. voltage is applied in such a polarity as to suppress the rotation of the rotary shaft 105. Consequently, the D.C. motor 121 poses a resistance to the movement of the accelerator pedal 75 through the pinion 125, large gear 107 and the rotary shaft 105. This resistance increases in accordance with an increase in the restoration force applied to the accelerator pedal 75. Thus, the second embodiment as described produces the same advantages as those offered by the first embodiment.

Figure 7:
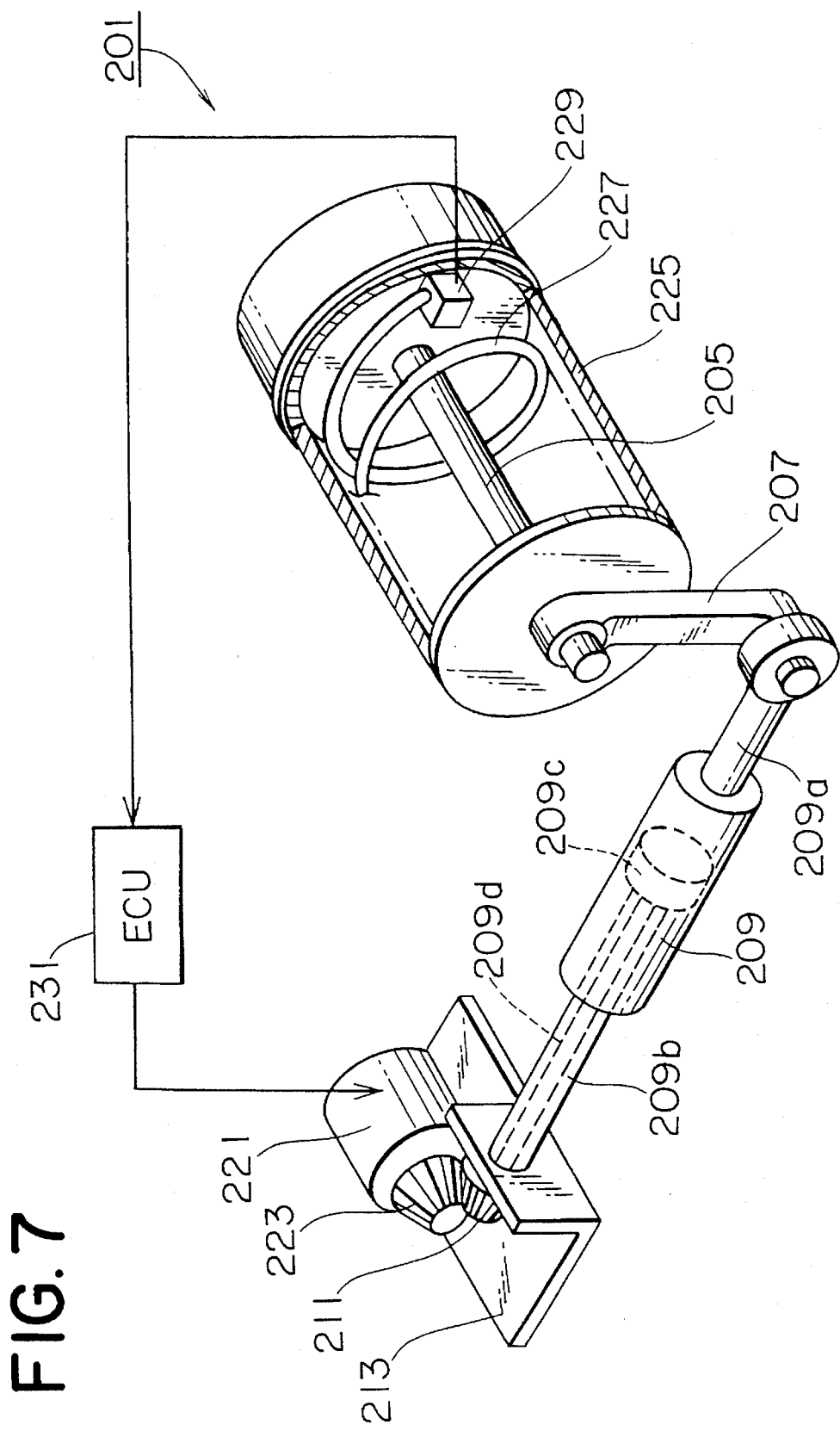
FIG. 7 is a perspective view of a third embodiment of the vehicle accelerator pedal device in accordance with the present invention.

FIG. 7 is a perspective view of a vehicle accelerator pedal device 201 as a third embodiment of the present invention. A rotary shaft 205 to which the lever 3 (see FIG. 3) is connectable is pivotally connected to a cylinder 209a of a damper 209 through a lever 207, such that the damper 209 extends and contracts in accordance with the rotation of the rotary shaft 205. The damper 209 has an orifice (not shown) which is provided in the piston 209c received in the cylinder 209a. The radius of the orifice is controllable by a control rod 209d so as to control resistance to movement of the piston 209c. A damper-side bevel gear 211 is fixed to the end of the control rod 209d. A D.C. motor 221 is fixed to a supporting bracket 213 which supports the end of the piston rod 209b. A motor-side bevel gear 223 is fixed to the shaft of the D.C. motor 221 for engagement with a damper-side bevel gear 221.

The rotary shaft 205 extends through a bore formed in a housing 225. As in the case of the second embodiment, the housing 225 houses a spring 227 which applies restoration force to the accelerator pedal 75 (see FIG. 3) through the rotor shaft 205. The housing 225 also receives a pressure sensor 229 which senses pressure applied by one end of the spring 227. The pressure signal from the pressure sensor 229 is input to an electronic control circuit 231 which controls the D.C. motor 221 in the following manner in accordance with the pressure signal.

Namely, the electronic control circuit 231 controls the D.C. motor 221 to rotate the control rod 209d such that the resistance against the movement of the piston 209c increases in accordance with increase in the restoration force applied to the accelerator pedal 75. As a consequence, the resistance against movement of the accelerator pedal 75 posed by the damper 209 increases in accordance with increase in the restoration force. Thus, the third embodiment also produces the same advantages as those produced by the first and second embodiments described before.

Figure 8:
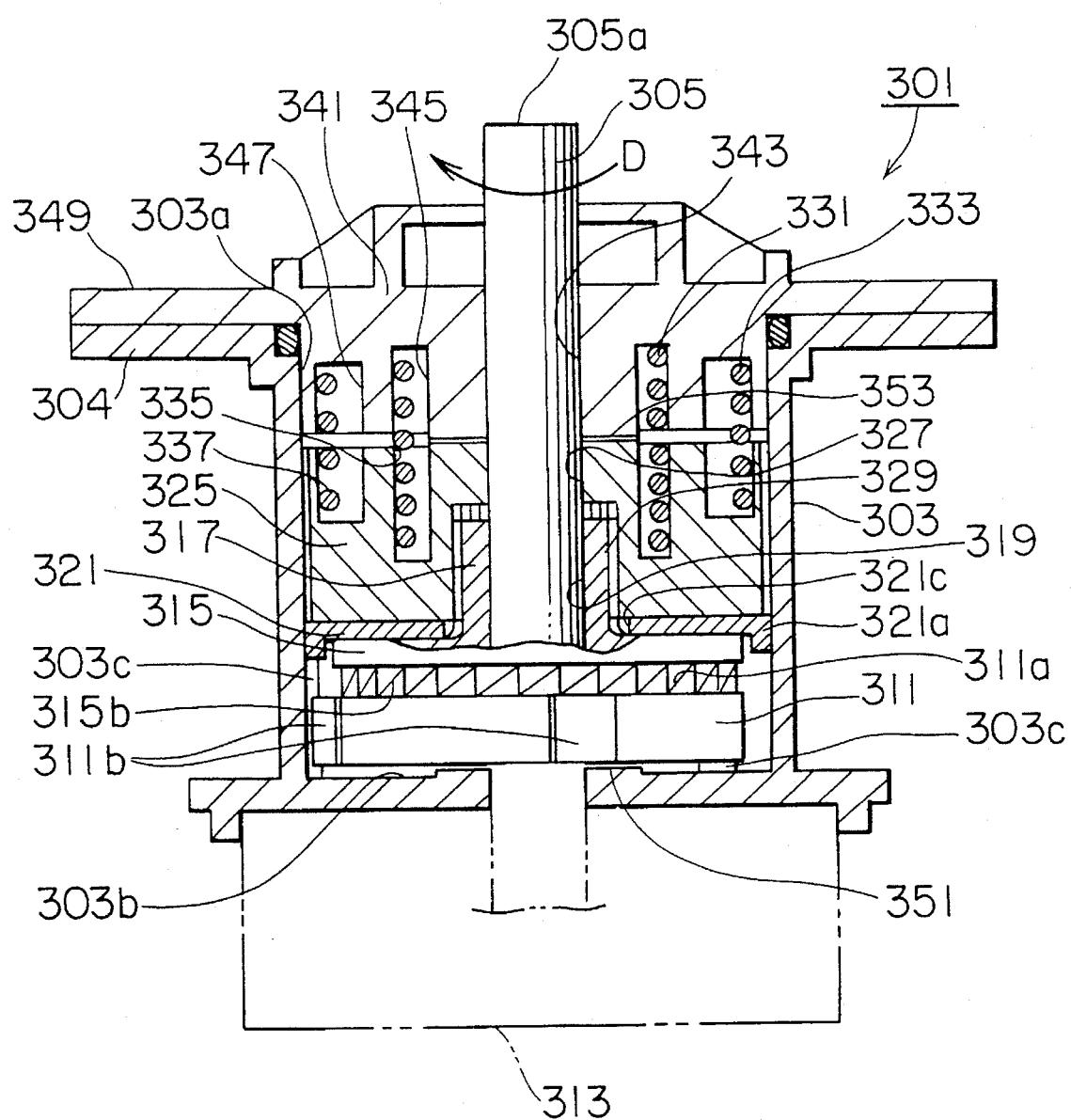
FIG. 8 is a sectional view of a fourth embodiment of the vehicle accelerator pedal device in accordance with the present invention.
Figure 9:
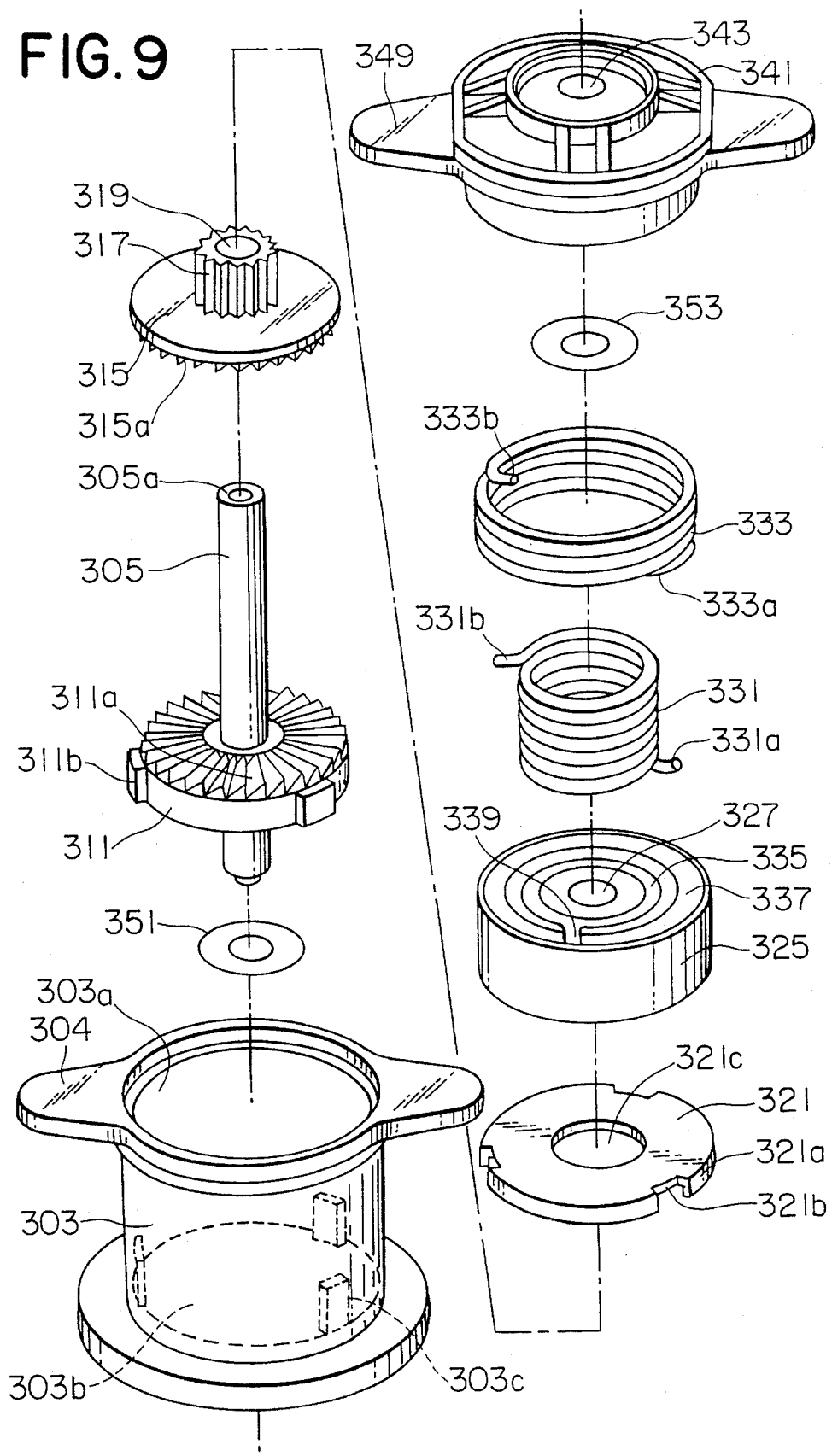
FIG. 9 is an exploded perspective view of the fourth embodiment.

An embodiment of the second aspect of the present invention will now be described with reference to FIGS. 8 to 11. FIG. 8 is a sectional view of a vehicle accelerator pedal device 301 as a fourth embodiment of the present invention, while FIG. 9 is an exploded perspective view of the same. As in the cases of the preceding embodiments, the accelerator pedal device 301 of this embodiment is connected through a lever 3 to an accelerator pedal 75 in the same way as that shown in FIG. 3.

Referring first to FIG. 8, a housing 303 has a pair of arms 304 which project laterally from a portion thereof adjacent to an opening of a bore 303a. The housing 303 rotatably receives a rotary shaft 305. A rotor 311 having a cam is fixed to the rotary shaft 305 coaxially therewith and is disposed near the bottom surface 303b of the housing 303. The lever (see FIG. 3) is adapted to be fixed to one end 305a of the rotary shaft 305, while the other end of the rotary shaft 305 is received in a bore formed in an accelerator position sensor 313 which is disposed outside the housing 303. A multiplicity of cam surfaces 311a are radially formed on the end of the rotor 311 adjacent to the end 305a of the shaft 305. The cam surfaces 311a are inclined in the direction in which the rotor 311 rotates in response to stepping down of the accelerator pedal 75 (see FIG. 3), at an angle θ see FIG. 10) which will be detailed later. Protrusions 311b are formed at 120° interval on the side surface of the rotor 311. The protrusions 311b engage with later-mentioned rubs 303c formed on the inner wall of the housing 303 so as to determine the restoration position of the rotor 311.

A friction plate 315 with cams is placed on the cam surfaces 311a of the rotor 311. A multiplicity of cam surfaces 315a for engagement with respective cam surfaces 311a on the rotor 311 are provided on the side of the friction plate 315 adjacent to the rotor 311. A spur gear 317 coaxial with the rotor shaft 305 is formed on the side of the friction plate 315 adjacent to the end 305a of the rotary shaft 305 integrally with the friction plate 315. The friction plate 315 and the spur gear 317 have bores which rotatably receive the rotary shaft 305.

A housing-side friction plate 321 is disposed on the surface of the friction plate 315. Notches 321b are formed at 120 o interval in thick-walled peripheral edge 321a of the housing-side friction plate 321, as shown in FIG. 9. The notches 321b engage with the ribs 303c formed on the inner surface of the housing 303 so that the housing-side friction plate 321 is movable axially relative to the housing 303 but is fixed against rotation relative to the housing 303. Referring back to FIG. 8, the ribs 303c extend only over a region between the bottom surface 303b of the housing 303 and the surface of the housing-side friction plate 321 adjacent to the shaft end 305a. Therefore, the housing-side friction plate 321 is slidable towards the end 305a only by a distance corresponding to the wall thickness of the peripheral portion 321a of the housing-side friction plate 321. The housing-side friction plate 321 has a bore 321c which is sized to rotatably receive the spur gear 317.

A rotor 325 with a friction surface is disposed on the surface of the housing-side friction plate 321. The rotor 325 has a bore 327 which is sized to rotatably receive the rotary shaft 305. A ring gear 329 for engagement with the spur gear 317 is formed on a portion of the wall of the bore 327 adjacent to the housing-side friction plate 321. Consequently, the friction plate 315 with cams and the rotor 325 with friction surface 325 rotate as a unit with each other. The ring gear 329 has a substantial axial length so that the spur gear 317 is slidable in the axial direction along the ring gear 329. The arrangement is such that a predetermined friction coefficient μ is developed between the surfaces of the friction plate 315 and the rotor 325 and the surface of the housing-side friction plate contactable with these surfaces.

A small-diameter annular groove 335 and a large-diameter annular groove 337 are formed in the end surface of the rotor 325 adjacent to the shaft end 305a, concentrically with the bore 327. These annular grooves 335 and 337 receive a small-diameter spring 331 and a large-diameter spring 333. The small-diameter annular groove 335 and the large-diameter annular groove 337 communicate with each other through a straight hole 339. both ends 331a, 331b of the small-diameter spring 331 are bent outward, while both ends 333a, 333b of the large diameter spring 333 are bent inward. The hole 339 retains the ends 331a, 333a of both springs 331, 333 adjacent to the rotor 325 having the friction surface.

A stopper 341 is disposed on the surface of the rotor 325 which receives the small-diameter spring 331 and the large-diameter spring 333. Referring again to FIG. 8, the stopper 341 has a bore 343 which is sized to be large enough to rotatably receives the rotor shaft 305. The stopper 341 further has a small-diameter annular groove 345 and a large-diameter annular groove 347 which are coaxial with the bore 343 and which are adapted to receive the small-diameter spring 331 and the large-diameter spring 333 inserted from the end adjacent to the rotor 325 with friction surface. A communication hole (not shown) similar to that 339 mentioned above is formed between the small-diameter annular groove 345 and the large-diameter annular groove 347. The communication hole 339 retains the ends 331b, 333b of the springs 331, 333 adjacent to the shaft end 305a. A pair of arms 349 project laterally from the stopper 341. The arms 349 are superposed on the arms 304 and fastened thereto by means of bolts, thus fixing the stopper 341 to the housing 303.

The bolts have a substantial length so as to project from the surfaces of the arms 349 and are used as means for fixing the whole accelerator pedal device 301 to a bracket 1a (see FIG. 3).

Washers 351 and 353 are interposed between the bottom surface 303b of the housing 303 and the rotor 311 with cams and between the rotor 325 wit friction surface and the stopper 341, so as to enable the rotor 311 with cams and the rotor 325 with friction surface to rotate smoothly.

The operation of the accelerator pedal device 301 having the described construction is as follows. As the driver depresses the accelerator pedal 75, the rotary shaft 305 and the rotor 311 with cams rotate in the direction of the arrow D in FIG. 8, i.e., in the direction in which the cam surfaces 311a of the rotor 311 are inclined. Consequently, due to engagement between the cam surfaces 311a and 315a, a torque E (see FIG. 10) is transmitted to the friction plate 315 with cams and the rotor 325 with friction surface, whereby the springs 331 and 333 are strained to produce restoration force to be applied to the accelerator pedal 75.

The torque E is transmitted through the meshing cam surfaces 311a, 315a which are inclined at the angle θ in the direction of rotation of the torque E. Consequently, a force F (see FIG. 10B) is generated so as to act to space the rotor 311 with cams and the friction plate 315 with cams apart from each other due to wedging action between the meshing cam surfaces 311a, 315a.

Figure 10B:
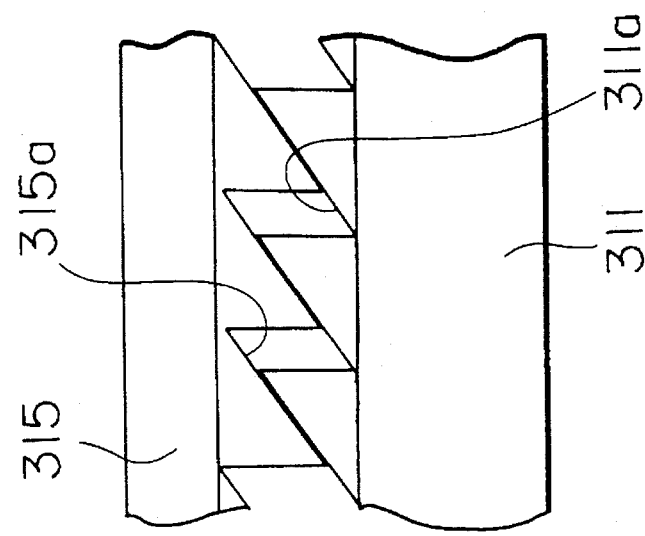
FIGS. 10A and 10B are illustrations of the principle of operation of the fourth embodiment.
Figure 10A:
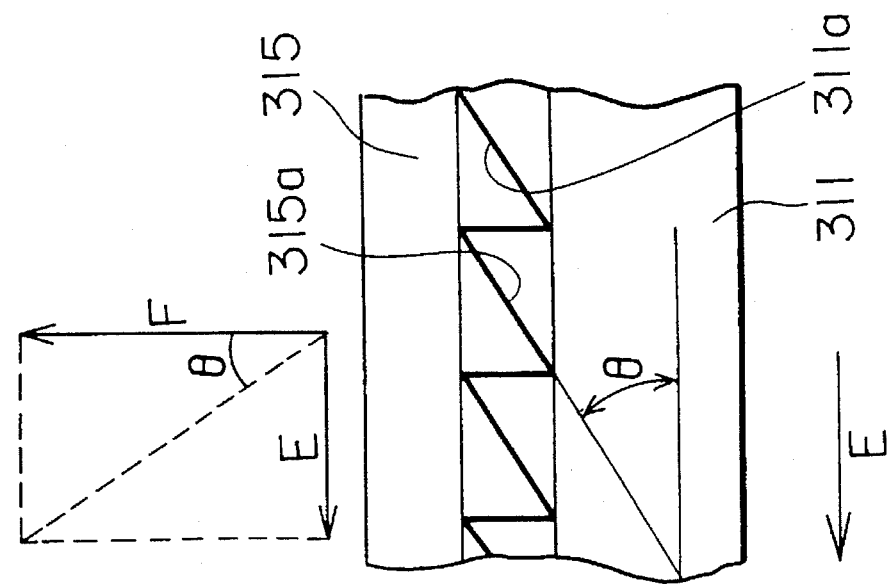

More specifically, when the accelerator pedal 75 is not depressed, no torque is applied to the rotor 311 with cams, so that the cam surfaces 311a and 315 fully mesh with each other, thus minimizing the distance between the rotor 311 with cams and the friction plate 315 with cams. However, when the torque E is applied to the rotor 311 with cams, the torque is decomposed due to the wedging action into rotational force and the vertical force F which acts to space the rotor 311 with cams and the friction plate 315 with cams apart from each other, as shown in FIG. 10B. The force F therefore will be referred to as "spacing force" hereinafter. The spacing force F acts to urge the friction plate 315 with cams and the housing-side friction plate 321 towards the rotor 325 with friction surface, whereby the friction forces acting on and between the friction plate 315 with cams, housing-side friction plate 321 and the rotor 325 with friction surface are enhanced.

A quantitative analysis of this operation is shown below. The above-mentioned rotational force E and the spacing force F, acting at a point on the rotor 311 with cams radiated by r from the center of the rotor 311, are expressed as follows, where T represents the torque applied to the rotary shaft 305 as a result of operation of the accelerator pedal 75.

$$E=T/r, \quad F=E/\tan\theta=T/(r\cdot\tan\theta)$$

In this embodiment, the angle q of inclination of the cam surfaces 311a, 315a are so determined as to meet the condition of $r\cdot\tan\theta=C$ (constant). With such an arrangement, it is possible to obtain a uniform distribution of the spacing force F over the entire areas of the cam surfaces 311a, 315a.

Representing the effective radius of the housing-side friction plate 321 by R, the total friction force S acting on the accelerator pedal 75 is expressed by the following equation:

$$S=2\mu\cdot F\cdot R=2\mu\cdot R\cdot T/C \tag{A}$$

As in the case of the first embodiment, the total friction S corresponds to the amount of hysteresis on the accelerator pedal 75. Thus, in the accelerator pedal device 301 of the described embodiment, the total friction force S acting on the accelerator pedal 75 varies in proportion to the torque T applied to the rotary shaft 305, i.e., in proportion to the manual step-down force exerted on the accelerator pedal 75. Consequently, the following advantages are obtained.

The restoration force produced by each coiled spring 331, 333 for restoring the accelerator pedal 75 increases in accordance with the distance that the accelerator pedal 75 is depressed. At the same time, the force necessary to depress the accelerator pedal 75, i.e., the torque T, also increases in accordance with the increase in the restoration force. Meanwhile, the total friction force S acting on the accelerator pedal 75 increases in accordance with an increase in the distance that the accelerator pedal is depressed. Consequently, the amount of hysteresis introduced into the relationship between the depression distance and depression force of the accelerator pedal 75 increases in accordance with an increase in the distance that the accelerator pedal is depressed as in the case of the first embodiment described above in connection with FIG. 5.

In this embodiment, the accelerator pedal 75 can be restored to a rest position without fail even when the restoration force applied to the accelerator pedal 75 is reduced due to, for example, breakdown of the spring 331 or 333. More specifically, when one of the springs 331 and 333 is broken, the restoration force acting on the accelerator pedal 75 is reduced to about half of that which would be applied when both springs 331, 333 are safe. At the same time, the torque T necessary for depressing the accelerator pedal 75 to a required amount is also reduced to about half the level which would be required when both springs are safe. As a consequence, the total friction force S corresponding to the depression distance of the accelerator pedal also is reduced to half. Consequently, the depression force required to depress the accelerator pedal by a desired amount also is reduced almost to half the force which would be required when both springs are safe, both when the depression force is being increased and when the depression force is being decreased. It is therefore possible to completely avoid occurrence of returning failure of the accelerator pedal, where the accelerator pedal is not restored to its rest, non-operating position even though the depression force has been reduced to zero.

Furthermore, this embodiment offers the following advantage, by virtue of the fact that the total friction force S decreases regardless of the level of the restoration force whenever the torque T is reduced.

The aforementioned friction coefficient μ may abnormally increase, due to, for example, damage to the surface of the housing-side friction plate 321 or surfaces of the rotor 325 with cams and the friction plate 315 with cams contacting the housing-side friction plate 321.

It is to be understood, however, the torque T applied to the rotary shaft 305 can be reduced to a sufficiently small level, as desired by the driver. For instance, the torque T is reduced to zero when the driver lifts his foot off the accelerator pedal 75. In such a case, the total friction force S is reduced to zero, as will be understood from the equation A. In this embodiment, therefore, it is possible to safely return the accelerator pedal 75 without fail, even when the friction coefficient μ has abnormally increased.

In this embodiment, the small-diameter spring 331, and the large-diameter spring 333 in combination provide the means for applying restoration force, while the friction plate 315 with cams, the housing-side friction plate 321, and the rotor 325 with a friction surface in cooperation form a device to apply resistance to movement of the accelerator pedal.

In the illustrated embodiment, the pressure acting on and between the friction plate 315 with cams, housing-side friction plate 321, and the rotor 325 with its friction surface is changed in accordance with the positional relation between the rotor 311 with cams and the friction plate 315 with cams, thus enabling adjustment of the resistance to movement of the accelerator pedal, i.e., the total friction force S. This, however, is only illustrative and various other suitable means may be employed for the purpose of controlling the resistance to movement of the accelerator pedal 75. For instance, the depression force exerted on the accelerator pedal 75 can be+-converted into electrical signals by means of a strain gauge attached to the side surface of he rotary shaft 305. When such an electric signal is available, the resistance to movement of the accelerator pedal 75 can be adjusted by means of a D.C. motor 121 or a damper 209, as in the cases of the second and third embodiments described before.

Figure 11:
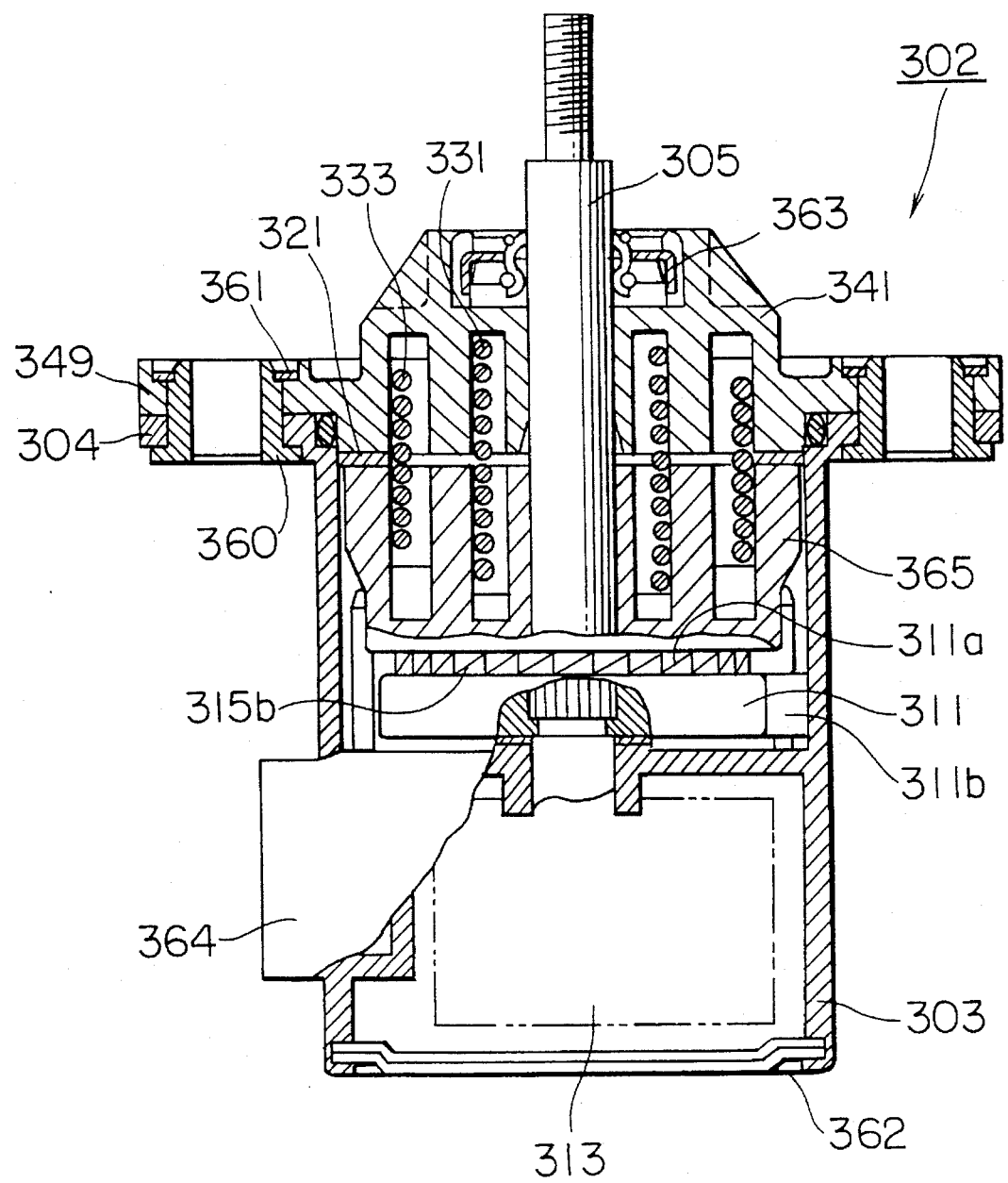
FIG. 11 is a sectional view of a vehicle accelerator pedal device as a fifth embodiment of the present invention.

FIG. 11 is a sectional view of a vehicle accelerator pedal device 302 as a fifth embodiment of the present invention. The accelerator pedal device 302 of the fifth embodiment is distinguished from the acceleration pedal device 301 of the fourth embodiment by the position of the friction plate 321. In FIG. 11, the components or parts of the fourth embodiment which are the same as those in the device 301 of the fourth embodiment are denoted by the same reference numerals, and detailed description of such components or parts is omitted.

A bushing 360 is received in through bores formed in each arm 304 of the housing 303 and in each arm of the stopper 341, so as to clamp these arms 304, 309 together in cooperation with a washer 361. The bushing 360 has a through bore which is penetrated by the aforementioned bolt. The housing 303 has, as an integral part thereof, a portion which defines a room for accommodating the accelerator pedal position sensor 313. The opening of the room is closed by a cover 362 which is placed after the accelerator position sensor 313 is received in the room. Numeral 363 denotes an oil seal, while 364 designates a connector for external transmission of the output signal from the accelerator pedal position sensor 313.

The major features which distinguishes the fifth embodiment from the fourth embodiment resides in the arrangement of a rotor 365 with cams and a friction plate 321. The rotor 365 with cams includes two integral portions: one plays the same role as the friction plate 315 with cams used in the fourth embodiment and one which functions in the same way as the rotor 325 with friction surface employed in the fourth embodiment. A ring-shaped friction plate 321 is interposed between a stopper 341 and a rotor 365 with cams and is fixed to the stopper 341. The surface of the rotor 365 with cams, contacting with the friction plate, serves as a friction surface. Alternatively, the friction plate 321 may be omitted, provided that the surface of the stopper adjacent to the friction plate 321 shown in FIG. 11 is formed to function as a friction surface.

In the fifth embodiment as described, the hysteresis characteristic varies according to the depression force exerted on the accelerator pedal as in the case of the fourth embodiment, so that excellent accelerator control can be achieved. In addition, the number of parts is reduced as compared with the fourth embodiment, offering an advantage in the production.

In each of the first to fifth embodiments described, a non-contact type angle sensor or a potentiometer can be used as the accelerator pedal position sensor. The non-contact type angle sensor may be of the type which employs a hall element or of the type which incorporates an optical encoder. It is also possible to use a pair of sensors of the same type, in order to ensure safe detection of the accelerator pedal position even in the event of a failure in one of these sensors.

As will be understood from the foregoing description, the first and second aspects of the present invention provide vehicle accelerator pedal devices in which the hysteresis characteristic introduced into the relationship between the depression distance and depression force of an accelerator pedal is increased in accordance with an increase in the distance that the accelerator pedal is depressed, thus offering a remarkable effect that excellent driveability of an engine can be maintained over the entire range of the motion of the accelerator pedal operation.

In particular, the first aspect of the present invention produces an effect that, even when the restoration force applied to the accelerator pedal is decreased due to a failure, the resistance to motion imparted on the accelerator pedal is reduced to a level correspond to the depressed level of the restoration force. It is therefore possible to safely return the accelerator pedal even in the event of an accidental reduction of the restoration force due to a failure.

The second aspect of the present invention also provides an advantage in that, even when the resistance to movement of the accelerator pedal has been increased due to, for example, long use, the resistance can be reduced to a level below that of the restoration force, by decreasing the manual depression force on the pedal to a sufficiently small level, thus ensuring that the accelerator pedal can be restored to its non-operated position without fail.

What is claimed is:

1. A pedal return device comprising:

a movable member;

a rotary shaft having an axis therealong and being connected to said movable member so as to rotate in correspondence with a movement of said movable member;

a first rotor fixedly mounted on said rotary shaft so as to rotate with said rotary shaft;

a second rotor rotatably mounted on said rotary shaft adjacent to said first rotor;

means for converting a torque from said rotary shaft into a linear force directed along said axis of said rotary shaft;

means for generating a frictional force which opposes rotation of said rotary shaft; and resilient means for generating and applying a rotational deflection force to said rotary shaft, said rotational deflection force being generated in correspondence with a rotation of said rotary shaft in a direction opposite to a direction of rotation of said rotary shaft.

2. A pedal return device according to claim 1, wherein said frictional force generated by said means for generating a frictional force opposes movement of said movable member.

3. A pedal return device according to claim 2, wherein said means for generating a frictional force includes a friction plate which is displaceable so as to contact an opposing surface and thereby generate a frictional force according to said rotational deflection force.

4. A pedal return device according to one of claims 1 or 2, wherein said means for generating a frictional force generates a frictional force according to a movement of said movable member and according to said rotational deflection force.

5. A pedal return device according to claim 4, wherein said means for generating a frictional force includes a friction plate which is displaceable so as to contact an opposing surface and thereby generate a contact frictional force according to said rotational deflection force.

6. A pedal return device according to one of claims 1 or 2, wherein said resilient means includes two springs.

7. A pedal return device according to claim 6, wherein said two springs are a pair of coiled torsion springs arranged coaxially with each other, said pair of coiled torsion springs being independently and torsionally flexed according to a movement of said movable member.

8. A pedal return device according to claim 4, wherein said resilient means includes two springs.

9. A pedal return device according to claim 8, wherein said two springs are a pair of coiled torsion springs arranged coaxially with each other, said pair of coiled torsion springs being independently and torsionally flexed in accordance with a movement of said movable member.

10. A pedal return device for a pedal, the device comprising:

a rotary shaft having an axis and which is connected to the pedal so as to rotate in correspondence with a movement of the pedal;

a housing rotatably supporting said rotary shaft;

a first rotor disposed in said housing and fixed to said rotary shaft so as to be rotatable therewith;

a second rotor disposed in said housing and rotatably mounted on said rotary shaft opposite said first rotor;

means for converting a torque from a rotation of said rotary shaft into a linear force directed along said axis of said rotary shaft;

means for generating a frictional force by converting said linear force into a frictional force acting between said first and second rotors; and resilient means for applying a rotation-inducing force to said second rotor.

11. A pedal return device according to claim 10, wherein said means for converting comprises a first cam surface provided on said first rotor and a second cam surface provided on said second rotor opposite said first cam surface, wherein said first and second cam surfaces are engagable with each other.

12. A pedal return device according to claim 11, wherein said first and second cam surfaces each have a plurality of cam projections, each cam projection having an inclined surface, wherein said first and second cam surfaces are engagable by abutting inclined surfaces of said first and second cam surfaces, respectively, against one another.

13. A pedal return device according to claim 10, wherein said resilient means includes two springs.

14. A pedal return device according to claim 13, wherein said two springs are a pair of torsion coil springs disposed concentrically about said rotary shaft, said pair of torsion coil springs being torsionally flexed according to movement of the pedal.

15. A pedal return device for a pedal, comprising:

a rotary shaft having an axis and being constructed and arranged so as to be rotatable according to movement of the pedal;

a support member supporting a first end portion of said rotary shaft;

a first rotor fixed to a second end portion of said rotary shaft so as to be rotatable with said rotary shaft, said first rotor having a first cam surface;

a second rotor mounted on said rotary shaft between said support member and said first rotor, said second rotor having a second cam surface opposing and engageable with said first cam surface, said first and second cam surfaces being collectively constructed and arranged to convert a torque from a rotation of said rotary shaft into a linear force directed along an axis of said rotary shaft;

a friction plate disposed between said second rotor and said support member, said friction plate being fixedly attached to one of said support member and said second rotor; and a torsional spring having a first end connected to said support member and a second end connected to said second rotor and being torsionally flexible along a direction of rotation of said rotary shaft.

16. A pedal return device according to claim 15, wherein said first and second cam surfaces each have a plurality of cam projections, each cam projection having an inclined surface, wherein said first and second cam surfaces are engageable by disposing said inclined surfaces of said cam projections of said first and second cam surfaces, respectively, in abutting relationship with one another.

* * * * *